Aug. 6, 1963  E. J. HUNKELER  3,099,901
METHOD AND MACHINE FOR FINISHING OR TESTING GEARS
Filed Aug. 25, 1961  3 Sheets-Sheet 1

INVENTOR.
ERNST J. HUNKELER
BY Richard W. Treverton
ATTORNEY

Aug. 6, 1963    E. J. HUNKELER    3,099,901
METHOD AND MACHINE FOR FINISHING OR TESTING GEARS
Filed Aug. 25, 1961    3 Sheets-Sheet 2

Aug. 6, 1963    E. J. HUNKELER    3,099,901
METHOD AND MACHINE FOR FINISHING OR TESTING GEARS
Filed Aug. 25, 1961    3 Sheets-Sheet 3

United States Patent Office 3,099,901
Patented Aug. 6, 1963

3,099,901
METHOD AND MACHINE FOR FINISHING OR TESTING GEARS
Ernst J. Hunkeler, Rochester, N.Y., assignor to The Gleason Works, Rochester, N.Y., a corporation of New York
Filed Aug. 25, 1961, Ser. No. 134,020
17 Claims. (Cl. 51—26)

The present invention relates to a method and machine for running together pairs of gears, especially bevel or hypoid gears, for finishing or testing, and is an improvement of the method and machine disclosed respectively in Patent No. 2,947,120, granted to O. F. Bauer and E. Stark, and Patent No. 3,069,813, granted to O. F. Bauer and myself.

According to the known method the gears while rotating about their respective axes are relatively oscillated about an axis which is perpendicular to their axes and which extends through their mesh zone, to shift the tooth bearing or contact area lengthwise of the teeth, and, simultaneously the gears are relatively oscillated in the directions of their respective axes to the extent necessary to maintain backlash and to control the position of the tooth bearing between the addendum and dedendum margins of the teeth. Thus three coordinated motions are involved.

The method of the present invention requires only a single motion, an oscillation about an axis that is in spaced parallel relation to the above-mentioned oscillation axis extending through the mesh zone. This obviates the need for mechanism heretofore required to coordinate the three motions and hence results in a substantial simplification of the machine.

According to the invention the method of running bevel or hypoid gears together for finishing or testing, wherein as the gears rotate there is a relative motion of them through a selected angle about a first axis which is perpendicular to their rotation axes and which extends through a selected mean point in their mesh zone, for shifting the tooth bearing lengthwise of the teeth, and wherein there is simultaneously a relative translation of the gears, in a plane perpendicular to said axis, of selected direction and magnitude for maintaining backlash and the position of the tooth bearing between the addendum and dedendum margins of the teeth, comprises effecting both of the afore-mentioned motions by moving one member of the pair through said selected angle about a second axis which is parallel to the first axis and at such distance and in such direction therefrom that the angular motion causes said mean point on said one member to be moved through an arc of approximately said selected direction and magnitude.

A machine according to the invention comprises a frame supporting housings which journal spindles for the gears, one housing being carried by a plate which is movable on the frame angularly and translationally in a plane parallel to both spindles, two sets of guide and follower elements of which one element of each set is carried by the frame and the other by the plate, said sets being arranged for guiding the portions of the plate that are respectively adjacent to them in different directions in said plane to thereby determine a pivot axis about which the plate is movable on the frame, said guides being adjustable angularly to vary the location of said pivot axis relative to the plate and the frame, and means for moving the plate about said pivot axis.

A preferred embodiment of the invention is shown in the accompanying drawings, wherein.

Figure 1:
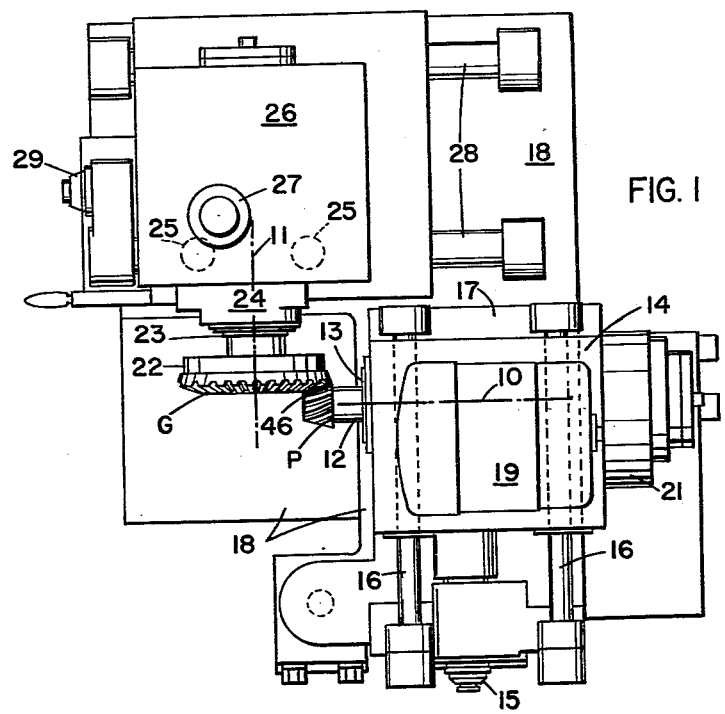
FIG. 1 is a plan view of the machine.

The illustrated machine is arranged to support and run together a bevel or hypoid pinion P and gear G, and, while they are so running, to effect small angular and translational motions between them in a plane parallel to their axes, designated 10 and 11 respectively. The pinion P is supported by a suitable chuck 12 on a spindle 13 journaled on axis 10 in a pinion spindle housing or head 14. The latter is adjustable, by suitable means including a screw which carries adjusting dial 15, along guide rods 16 supported by a plate 17 on machine frame 18. The spindle 13 is driven by a reversible electric motor 19 through a belt drive (not shown) beneath cover 21. The gear G is supported by an arbor 22 on a spindle 23 journaled for rotation about axis 11 in a gear spindle housing or head 24. The latter is adjustable vertically, along guide rods 25 secured to a column 26, such adjustment being made by means of a screw which carries adjusting dial 27. Column 26 is adjustable along guide rods 28 on the machine frame by means of a screw whose outer end carries an adjusting dial 29. By the adjustment of pinion head 14 along guide rods 16, and the adjustments of gear head 24 along rods 25 and 28, any bevel or hypoid gear pair within the range of the machine may be brought into running position. Drive load may be imposed on the gears by means of a suitable brake on spindle 23.

Figure 2:
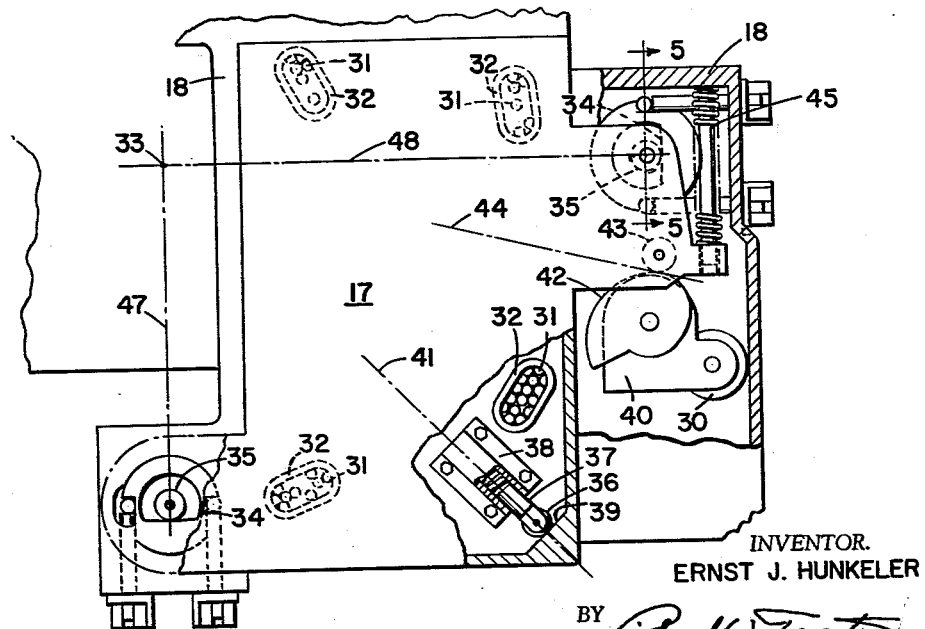
FIG. 2 is a plan view, partly in section, showing on a larger scale the mechanism for supporting and oscillating the plate.
Figures 3, 4:
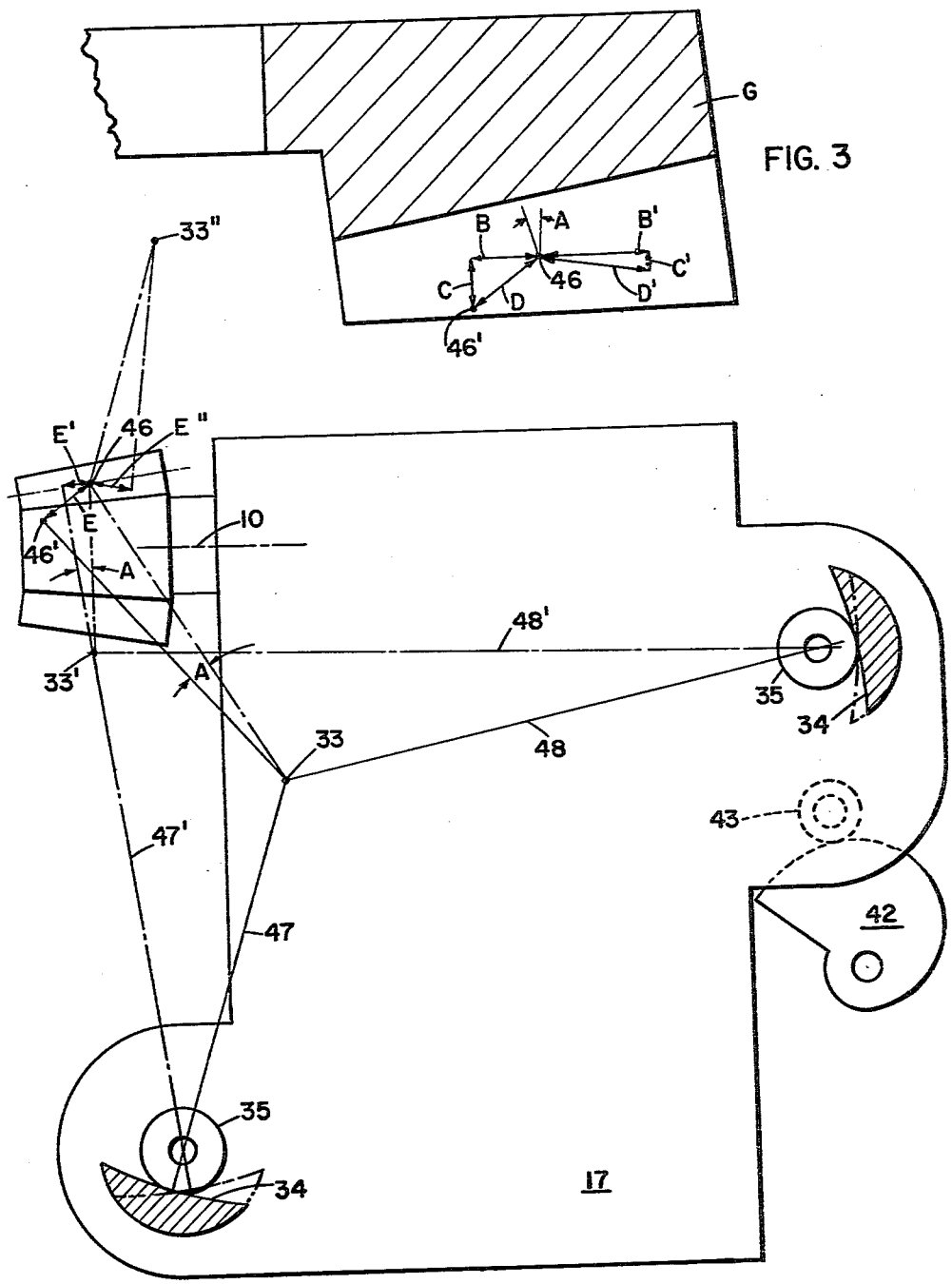
FIG. 3 is a fragmentary sectional view through a gear, in the plane of the gear axis.
FIG. 4 is a diagrammatic plan view to illustrate the principles of operation of the machine.

The plate 17 has plane horizontal surfaces resting on ball bearings 31 which in turn rest on plane horizontal surfaces on frame 18, the balls being confined by oval frames 32. These bearings enable free movement of the plate both angularly and translationally on the frame in any direction in a horizontal plane. The axis of the angular motion, 33 in FIGS. 2 and 4, is established by two sets of guides and follower elements, of which the guides, 34, are carried by the frame and the rollers, 35, by widely spaced portions of the plate. The two guide-follower sets are spaced from each other at an angle of about ninety degrees around this axis, as shown in FIG. 2. A roller 36, carried by a spring-backed plunger 37 which is slidable in a bracket 38 on the frame, acts against surface 39 of the plate 17. The pressure of this biasing means is exerted in the direction of line 41 which divides the ninety degree angle, and thus holds both rollers 35 against their guides 34.

The plate 17 is oscillated about axis 33 by a cam 42 which is rotatable on the frame 18 and is driven back and forth by means including a reversible electric motor 30 and reduction gearing in gear box 40, FIG. 2. The reversing of this motor is effected by suitable switch means which, as described in afore-mentioned Patent No. 3,069,813, are adjustable so that the angular motion of the cam to either side of the starting position is adjustable, and may, if desired, be different when the spindle drive motor 19 is operating forwardly than when it is operating reversely. The cam acts against a follower roller 43 on plate 17. Preferably the tangent 44 to cam and roller at their point of contact is approximately radial of the mean position of pivot axis 33, as shown. A spring 45 acting between the frame and plate 17 biases the plate in a direction to maintain contact between the cam and roller.

According to the method described in the afore-mentioned patent and application, oscillation of the pinion through a given angle A, FIG. 3, about axis 46 to one side of the starting position may be accompanied by reciprocations B and C, respectively in the direction of the pinion axis 10 and of the gear axis 11, while oscillation through the same or another angle A to the opposite side of the mean starting position may be accompanied by reciprocations B' and C' of different magnitudes. The resultant of motions B and C is designated D, while that of motions B' and C' is designated D'. Considering axis 46 to be affixed to the pinion, the effect of resultant motion D is to move the axis to 46'.

Referring now to FIG. 4, illustrating the present method, the reciprocations B and C (and B' and C') are eliminated by making the oscillation through angle A occur about axis 33 which is so spaced and in such direction from axis 46 that the latter is swung through an arc which closely approximates the resultant of the reciprocating motions in both magnitude and direction. For example the arc of oscillation E is made to closely approximate resultant D of reciprocations B and C.

For a given angle A, the magnitude and direction of arc E may be varied by changing the position of axis 33. For instance if the latter is moved to position 33' the axis 46 in swinging through angle A will traverse the much shorter arc E' which is much less inclined to the pinion axis 10 than is arc E. For another example, if the axis 33 is moved to 33'', the axis 46 will be moved through arc E'' by the same angular motion A. In this latter example it will be noted that the direction of displacement of axis 46 along the tooth is reversed relative to the direction of angular motion.

The position of axis 33 is shifted by changing the inclinations of guides 34. When the latter are in their full line positions in FIG. 4, axis 33 is at the intersection of lines 47 and 48 which are normal to the guide surfaces at their points of contact with guide rollers 35. By shifting the guides angularly to their positions shown in broken lines the normals are displaced respectively to 47' and 48' with resultant shift of axis 33 to 33'.

The active surfaces of guides 34 are preferably curved, with their axes of curvature coincident with axis 33 when the latter is in a design mean position. Accordingly when in this mean position no displacement of the axis 33 results from angular motion of plate 17. In other positions of the axis 33 the angular motion results in a slight shifting of the axis, but the magnitude of this shifting is inconsequential, due to the small amplitude of the oscillation A and the small displacement of the axis 33. These are greatly exaggerated in FIGS. 3 and 4 for better illustration of the principles involved. In a usual case the angle A is on the order of one degree, and the distance between axis 33 and axis 46, for a gear of about one inch face width, is usually between one and two inches, which means that the length of arc E may be between 0.017 and 0.035 inch. On the other hand the distance between axis 33 and guides 34 is proportionately much greater than appears from FIG. 4. Consequently the angular adjustments of the guides required to produce the desired shifting of axis 33 is in practice only a small fraction of that shown in FIG. 4.

Figure 5:
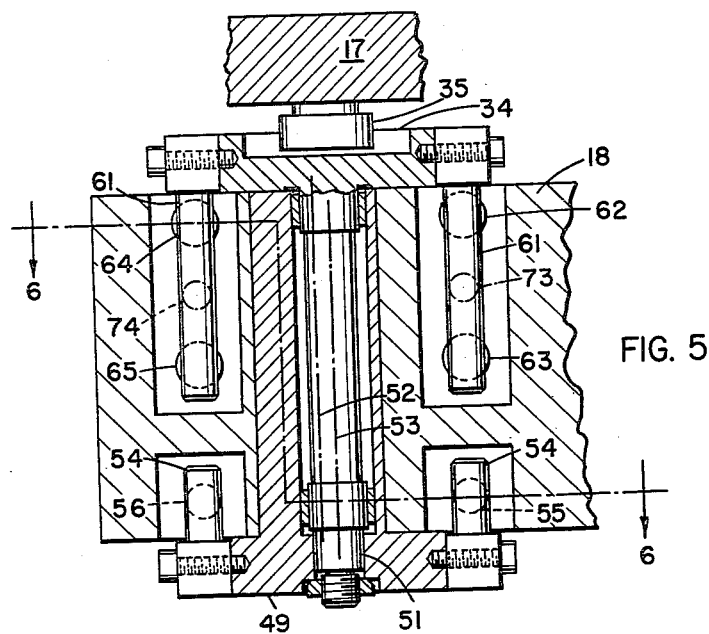
FIG. 5 is a detail vertical sectional view in planes 5—5 of FIGS. 2 and 6.
Figure 6:
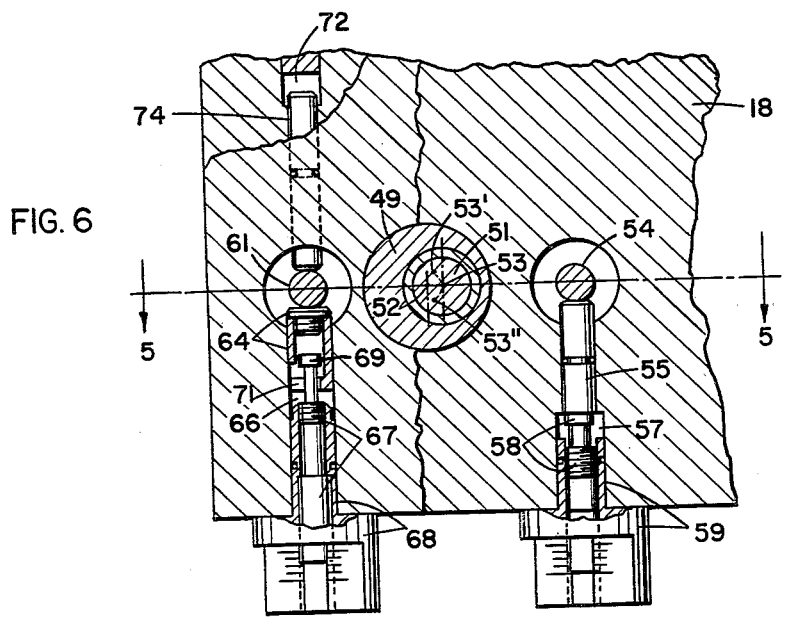
FIG. 6 is a plan sectional view primarily in planes 6—6 of FIG. 5.

During operation of the illustrated machine the axis 33 may be shifted between four different positions selected during set up of the machine for gears of a particular design. These four positions are: (1) for forward drive of the gears by motor 19 and with the oscillating motion A to one side of the starting or on-center position, to produce arcuate displacement E, FIG. 4, corresponding to resultant D in FIG. 3, (2) also for forward drive but with the oscillating motion to the other side of on-center position, corresponding to resultant D', (3) for reverse drive of the gears and with the oscillating motion to one side of on-center position, and (4) for reverse drive and with the oscillating motion to the other side of on-center position. Further, the axis 33 may be shifted to a different on-center position for reverse drive of the gears than for forward drive. Duplicate mechanisms, one of which is shown in detail in FIGS. 5 and 6, are employed to actuate the two guides 34 to obtain these different positions of the oscillation axis.

The mechanism illustrated includes an eccentric sleeve 49 in which the stem 51 of guide 34 is journaled for motion about a vertical axis, and the sleeve itself is angularly movable in the frame about a parallel axis. By such motion of the sleeve about its axis, designated 52, the axis 53 of stem 51 may be shifted, for example to position 53' or 53'', to thereby shift the axis 33 to the left or right in FIG. 2. In this way the on-center position of axis 33 may be different for running the gears, P, G forwardly than for running them reversely. Such shifting is of very small magnitude, usually on the order of one or a few thousandths of an inch, so that in any on-center position the axis 53 is so nearly aligned with the axis of follower roller 35 that angular adjustment of the guide 34 about this axis does not itself disturb the position of axis 33. The sleeve 49 has secured thereto, on opposite sides of axis 53, parallel pins 54. Abutting one pin is a piston 55 and abutting the other an identical piston 56, both pistons being operable in cylinders in the frame. Hydraulic pressure may be applied to either piston through the cylinder chamber at the back thereof, designated 57. An adjustable stop screw 58 is arranged back of each piston to limit its motion in a direction away from its pin 54. When pressure is applied to piston 55, and the chamber back of piston 56 is placed on exhaust, the sleeve 49 is rotated, counterclockwise in FIG. 6, to a limit position wherein piston 56 abuts its stop screw 58. This may be the position wherein axis 53 is at 53'. Upon pressure reversal, to apply pressure to piston 56 and relieve piston 55 from pressure, the sleeve 49 will be turned clockwise to a limit position determined by the adjustable stop screw 58 back of piston 55. In this position axis 53 may be at 53''. The application of pressure to pistons 55 and 56 may be controlled by a solenoid valve, not shown, which is reversed concomitantly with reversal of motor 19. As shown, the stop screws 58 are threaded into sleeves 59 which are secured to the frame and bear graduations to facilitate adjustment of the screws.

Secured to guide 34 on opposite sides of axis 53 are parallel pins 61 one of which is adapted for abutment by identical pistons 62 and 63, and the other by identical pistons 64 and 65. These pistons also operate in cylinders in the frame, each of them being movable forwardly toward the related pin 61 by application of hydraulic pressure to the cylinder chamber 66 back of it. The forward limit position of each piston is controlled by an adjustable stop screw 67 that is screw-threaded to a sleeve 68 on the frame and is of the same form as sleeves 59. Each screw 67 has a head 69 for abutment with a flange 71 of the related piston. The pins 61 are held against whichever one of pistons 62 to 65 is effective by application of pressure to cylinder chamber 72 back of one of the smaller-area opposing pistons designated 73 and 74, which also operate in cylinders provided in the frame.

When motor 19 is running forwardly, pressure is applied to piston 73, and when it is running in reverse, to piston 74. During forward operation pressure is applied to piston 62 during oscillation of plate 17 about axis 33 to one side of the on-center position, and to piston 63 during oscillation to the other side, the pressure application being controlled by a solenoid valve and reversing switch therefor, not shown, the switch being reversed by an actuating button on cam 42 each time the cam during its oscillation passes through its on-center position. Similarly, during reverse operation of motor 19, pressure is applied to piston 64 during oscillation of the plate to one side of the on-center position and to piston 65 during oscillation of the plate to the opposite side.

Having now described the preferred embodiment of my invention, what I claim is:

1. The method of running a pair of gears together, wherein as the gears rotate there is a relative motion of them through a selected angle about a first axis which is perpendicular to their rotation axes and which extends through a selected mean point in their mesh zone, for shifting the tooth bearing lengthwise of the teeth, and wherein there is simultaneously a relative translation of the gears, in a plane perpendicular to said axis, of selected direction and magnitude for maintaining backlash and the position of the tooth bearing between the addendum and dedendum margins of the teeth, which comprises effecting both of the afore-mentioned motions by moving one member of the pair through said selected angle about a second axis which is parallel to the first axis and at such distance and in such direction therefrom that the angular motion causes said mean point on said one member to be moved through an arc of approximately said selected direction and magnitude.

2. The method of claim 1 in which the magnitude of the relative translation for a given amount of angular motion is made different in different phases of operation by changing the position of the second axis relative to said mean point.

3. The method of claim 2 in which the magnitude of the relative translation for a given amount of angular motion is increased and decreased respectively by increase and decrease of the distance between the second axis and said mean point.

4. The method of claim 2 in which the direction of the relative translation is also made different in different phases of operation by changing the position of the second axis relative to said mean point.

5. The method of claim 1 in which the direction of the relative translation is made different in different phases of operation by changing the position of the second axis relative to said mean point.

6. The method of running a pair of gears together in which while the gears are running in mesh one of them is oscillated about an axis spaced from a mean point of their mesh zone, and the position of said axis relative to the gears is changed for different phases of the oscillation but is maintained perpendicular to their axes of rotation.

7. The method of claim 6 in which said position of the axis is different when said one of the gears is to one side of its on-center position of oscillation than when it is to the other side of its on-center position.

8. A machine for running pairs of gears together, comprising a frame supporting housings which journal spindles for the gears, one housing being carried by a plate which is movable on the frame angularly and translationally in a plane parallel to both spindles, two sets of guide and follower elements of which one element of each set in carried by the frame and the other by the plate, said sets guiding the portions of the plate that are respectively adjacent to them in different directions in said plane to thereby determine a pivot axis about which the plate is movable on the frame, said guides being adjustable angularly to vary the location of said pivot axis relative to the plate and the frame, and means for moving the plate about said pivot axis.

9. A machine according to claim 8 in which said guide elements are also adjustable translationally, to vary the position of the plate on the frame in said plane.

10. A machine according to claim 8 in which the guide elements of said sets are adjustable on the frame about axes perpendicular to said plane and the follower elements of said sets are carried by the plate.

11. A machine according to claim 10 in which the adjustment axes of the two guide elements are respectively adjustable on the frame in two different directions in said plane, to thereby vary the position of the plate on the frame.

12. A machine according to claim 11 in which there are hydraulically operated means for shifting said adjustment axes on the frame, and two adjustable stops to respectively determine the opposite limit positions of such shifting.

13. A machine according to claim 8 in which said guide elements are spaced from each other about a mean position of the pivot axis by an angle of approximately ninety degrees and there is a biasing means acting between the frame and the plate in a line dividing said angle for holding the follower and guide elements in contact.

14. A machine according to claim 8 in which the means for moving the plate comprise a cam and cam follower, and a reversible motor drive for oscillating the cam to thereby oscillate the plate about said pivot axis.

15. A machine according to claim 14 in which the cam follower is carried by the plate, the cam is rotatable on the frame by said motor drive, and there is a biasing means acting between the plate and the frame for holding the cam and follower in contact.

16. A machine according to claim 8 having a plurality of independently adjustable stops for each guide element, each such stop being arranged to determine one limit position of the guide element, and means for rendering said stops effective and ineffective during operation of the machine to thereby vary the position of the pivot axis.

17. A machine according to claim 16 in which the means for rendering said stops effective and ineffective comprise an hydraulically operated piston for each stop, each piston being arranged when actuated by hydraulic pressure to move the guide element to a position determined by abutment with the related stop.

References Cited in the file of this patent

UNITED STATES PATENTS 2,947,120    Bauer et al. _____ Aug. 2, 1960